United States Patent
Ferenczi et al.

(10) Patent No.: US 7,369,948 B1
(45) Date of Patent: May 6, 2008

(54) SYSTEM AND METHODS FOR PREDICTING FAILURES IN A FLUID DELIVERY SYSTEM

(75) Inventors: John L. Ferenczi, Cary, NC (US); William G. Barrus, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/557,304

(22) Filed: Nov. 7, 2006

(51) Int. Cl.
*G06F 15/00* (2006.01)
(52) U.S. Cl. .......................... 702/35; 709/201; 324/306
(58) Field of Classification Search ................. 702/35, 702/188, 45–48, 182–185, 201; 340/58, 340/306
See application file for complete search history.

(56) References Cited

U.S. PATENT DOCUMENTS

| | | | |
|---|---|---|---|
| 4,088,987 A * | 5/1978 | Resler et al. ............... | 340/605 |
| 5,604,681 A | 2/1997 | Koeninger | |
| 6,581,449 B1 | 6/2003 | Brown et al. | |
| 6,720,866 B1 | 4/2004 | Sorrells et al. | |
| 6,915,848 B2 | 7/2005 | Thomeer et al. | |
| 2004/0051368 A1 | 3/2004 | Caputo et al. | |
| 2004/0193453 A1 | 9/2004 | Butterfield et al. | |
| 2004/0204856 A1 | 10/2004 | Jenkins et al. | |
| 2004/0236547 A1 | 11/2004 | Rappaport et al. | |
| 2004/0256113 A1 | 12/2004 | Logiudice et al. | |

OTHER PUBLICATIONS

David E. Culler and Hans Mulder, "Sensor Nets/RFID", Aug. 2, 2004, intel, pp. 1-12 (http://www.intel.com/research/exploratory/smartnetwork.htm.*

* cited by examiner

*Primary Examiner*—Edward Raymond
(74) *Attorney, Agent, or Firm*—Akerman Senterfitt

(57) ABSTRACT

A system for detecting defects in a fluid delivery line is provided, the system comprising a plurality of sensors disposed in a fluid delivery line, wherein each one of the plurality of sensors comprises a mote coupled to a plurality of sensing devices disposed in a film system, wherein a first mote being configured to receive data from at least one second mote, wherein the first mote being further configured to transmit data collected from the plurality of sensing devices coupled the first mote and received data from the at least second mote, a communications hub configured to receive sensor data from at least one mote, and a processor coupled to the antenna, the processor being configured to analyze sensor data received from the at least one mote.

7 Claims, 4 Drawing Sheets

SYSTEM AND METHODS FOR PREDICTING FAILURES IN A FLUID DELIVERY SYSTEM

FIELD OF THE INVENTION

The present invention is related to the field of sensing devices and more particularly, to sensing and monitoring conditions for fluid delivery systems

BACKGROUND OF THE INVENTION

The detection of problems in a fluid delivery system is generally problematic. The most common problems leading to catastrophic failures in such systems, such as minor leaks, contamination, or pump or other equipment breakdown, are generally undetectable until a severe failure occurs, often resulting in large costs associated not only with the ensuing repairs, but also associated with the subsequent clean up of the material released as a result of the failure of the fluid delivery system. In many cases, clean up costs can escalate quickly, especially for potentially volatile or hazardous substances, such as fuel products or cleaning products. However, clean up costs comprise only one aspect of the financial loss to the business. In industries relying on fluid delivery systems, a catastrophic event represents not only a repair and clean up cost associated with the event, but also a loss on the goods being transported in the fluid delivery system. Therefore, businesses involved in such an enterprise are often seeking ways to minimize such types of losses by attempting to predict when catastrophic failures will occur and planning accordingly by exchanging parts out on a regular basis or budgeting for such events. However, even such measures do not always protect the business adequately, as the result and frequency of such events is often unpredictable.

In general, in order to prevent failures, businesses rely on careful monitoring of a fluid delivery system in order to detect any variation in the performance of the system. Such monitoring of fluid delivery systems generally comprises monitoring of the various components at all times. For example, pressure gauges may be installed at various points in the delivery system. Additionally, equipment performance, such as pump temperature or pump rotation speed, may also be monitored. Another method of monitoring fluid delivery systems is the manual inspection of the various components of the system. However, a manual inspection of the various components can be not only time-consuming, but also difficult where components of the system may be installed such that a thorough inspection is physically difficult to accomplish. In either case, once a problem is detected, the system is shutdown and the problem is verified and repaired if necessary.

However, the difficulty in using such systems is that any subtle signals that may signal an impending failure are often difficult, if not impossible to discern from the normal variation in performance of the system. Furthermore, these types of monitoring systems rely on statistical analysis and action is generally only taken when the data being monitored exceeds a pre-determined tolerance range or the calculated useful lifetime of a component has elapsed. Therefore, such systems are incapable of detecting subtle changes that may be precursors of a severe failure.

One method of differentiating between normal fluctuations and indicators of impending failure is an extended analysis of the monitored data. Experiments in many fields have found that patterns of impending damage in many types of networks start to form hours, perhaps days before a crisis situation occurs. The method of detecting these patterns in such networks has been very limited until recent years. It also been demonstrated that continuous pattern sampling and analysis can show that even for systems only demonstrating apparently random fluctuations, once a problem exists in a network, the underlying organizing patterns associated with a failure will eventually reach a terminal, perhaps crisis situation.

For example, studies of the human brain show that the natural disharmonic state of human brainwaves tends to harmonize to a single frequency pattern prior to the occurrence of some types of seizures. In such individuals, it has been demonstrated that the movement of the brain to such a harmonious state can sometimes be detected hours, even days, before a seizure episode.

In a fluid delivery system, the same phenomena can occur. However, detecting such problems in real time and identifying the failure point is problematic. Even if data from various existing monitoring devices could be collected and analyzed, because of the subtle variations sought to be detected, existing instrumentation, such as pressure gauges, flow meters, and thermometers, is often insufficient. Furthermore, when dealing with fluid delivery lines that extend over long distances, perhaps over hundreds of miles, the cost of constructing, maintaining, installing, and monitoring such devices can be costly and cumbersome. Therefore, there is a need for utilizing newer technologies, capable of deployment over long distances and having lower cost of operation, such as miniature sensors, wireless data acquisition, and advanced computing methods, for use in failure prediction systems for fluid delivery systems.

SUMMARY OF THE INVENTION

The present invention provides for monitoring of fluid delivery systems using a system of remote sensing devices. The remote sensing devices can be configured to detect minor variations in the flow of material being transported. The remote sensing devices collect data that can be analyzed using a computing device, which can then determine when a pattern predicting an impending failure emerges.

One embodiment of the invention is a system including a plurality of sensors disposed in a fluid delivery line, where each one of the plurality of sensors consists of a mote coupled to a plurality of sensing devices disposed in a film system. In the system, a first mote can be configured to receive data from other motes. The first mote can be further configured to transmit data collected from the plurality of sensing devices coupled to the first mote and received data from the at least second mote. The system can also include a communications hub configured to receive signal carrying sensor data from at least one mote. The system can also include a processor coupled to the communications hub, where the processor can be configured to analyze sensor data received from the at least one mote.

In some embodiments, the plurality of sensing devices can include a plurality of activating devices coupled to plurality of corresponding signaling devices, where the response of an activating device activates a corresponding signaling device. In some embodiments, a signal produced by at least a first one the signaling devices is different from a signal produced by at least another of the signaling devices. In some embodiments, the signaling devices can consist of RF tags. In some embodiments, at least a first one activating devices is adapted to respond differently than another of the activating devices.

In various embodiments, the film system consists at least two layers of film, where the sensing devices are disposed therebetween. In some embodiments the film system further includes a middle layer of film between the plurality of activating devices and the plurality of corresponding devices.

Other embodiments, when configured in accordance with the inventive arrangements disclosed herein, can include methods or computer-readable storage medium having computer code for performing the various processes and processes disclosed herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION

With reference now to the various figures in which like elements are identically numbered throughout, a description of the various embodiments of the present invention will now be provided. While the invention is disclosed in the context of a single arrangement, it can be appreciated that the invention can include numerous modifications from the presented embodiment.

Figure 1:
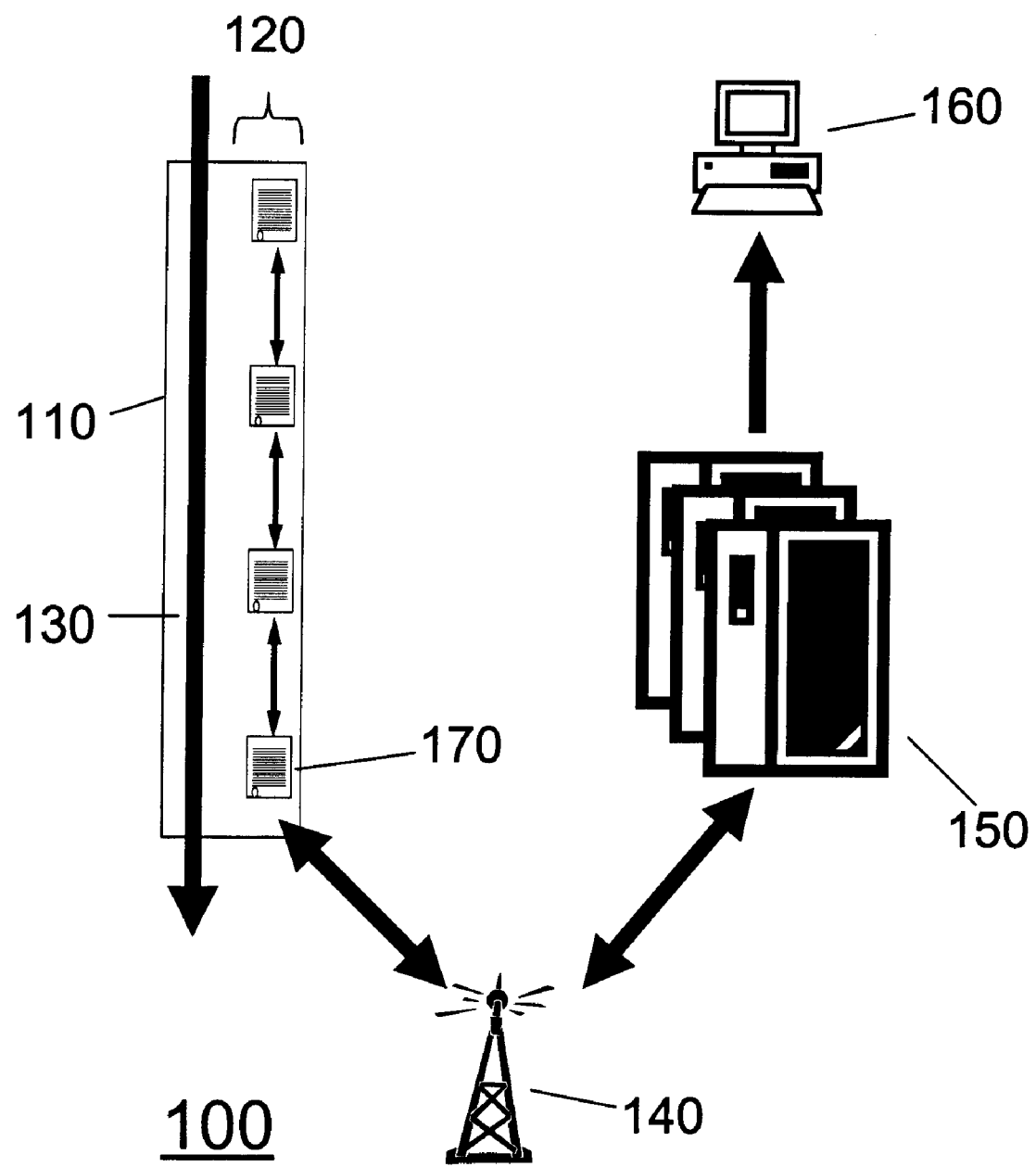
FIG. 1 is an illustration of a system in accordance with an embodiment of the invention.

FIG. 1 is a schematic illustration of a system 100 for monitoring pressure patterns in a fluid delivery system 110. The system 100 illustratively includes a plurality of sensors 120 that collect data regarding the flow of a product 130 through the fluid delivery system 110. In the various embodiments, the product 130 can comprise any gas, liquid, or solid materials that can be delivered via a fluid delivery system 110, such as water, oil, natural gas, and semi-fluid solid substances such as grains. Furthermore, in the illustrated embodiment, a sensor 120 is configured to detect changes in pressure. In other embodiments, the sensors 120 can be adapted to chart other physical properties of the product 130, including, but not limited to, temperature, density, pH, color, transparency, or chemical composition.

The system 100 in FIG. 1 further illustratively includes a communications hub 140 configured to communicate with at least one of the sensors 120, where at least one sensor 120 can be configured to transmit product 130 property data to the communications hub 140. The system 100 further illustratively includes a processor 150 or other computing system coupled to the communications hub 140, used to perform a pattern search analysis on the sensor data received by the communications hub 140. In the illustrative system, the processor 150 can be further coupled to a terminal or other notification system 160 to provide one or more users with notification of a pattern predicting impending failure emerging in the data being collected by the sensors 120. In the various embodiments, the various connections between a sensor 120, the communications hub 140, the processor 150, and the notification system 160 can be configured to comprise any combination of wired and/or wireless connections.

Figure 2:
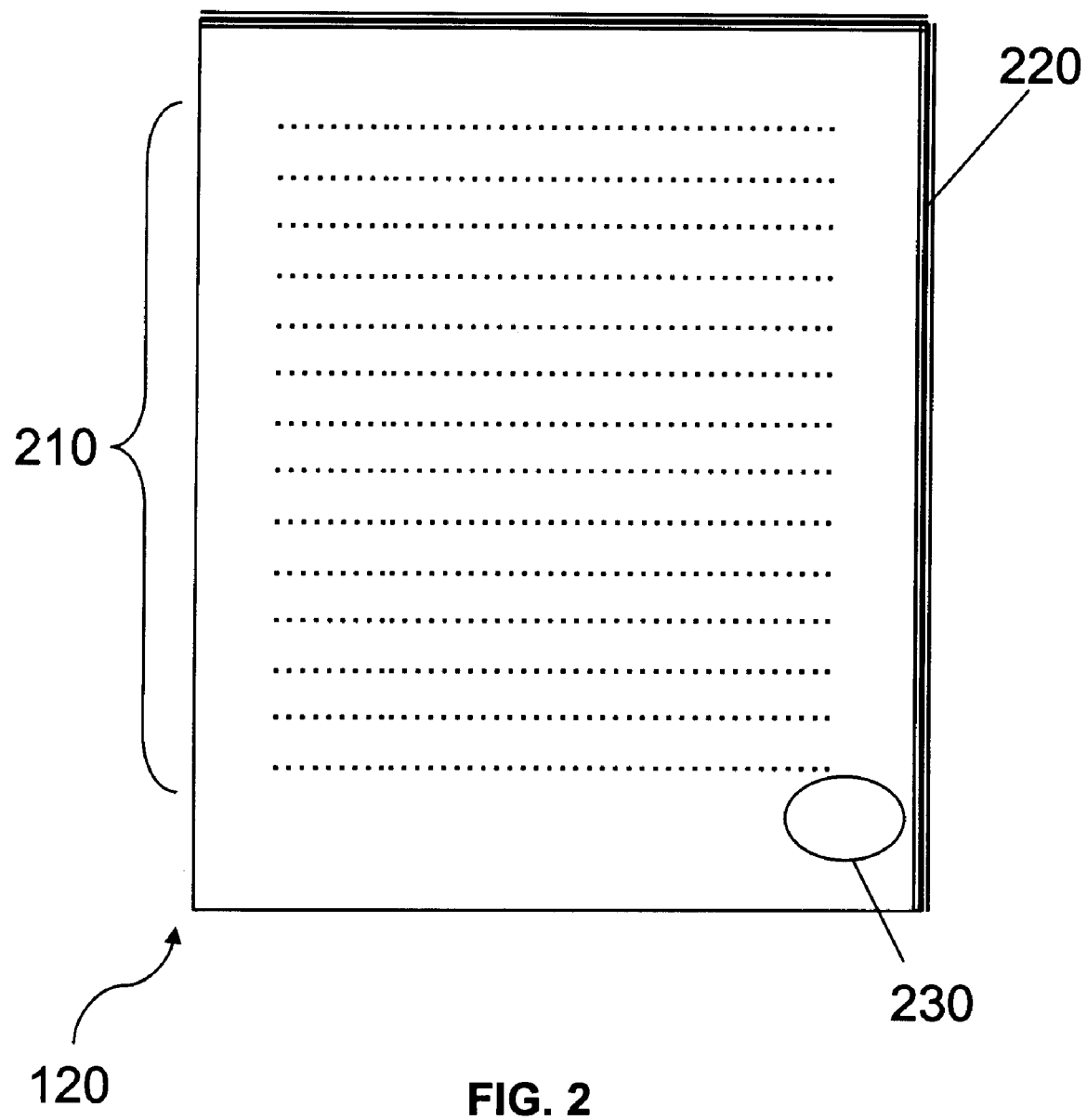
FIG. 2 is an illustration of a sensor in accordance with an embodiment of the invention.

In the various embodiments, a sensor 120 can comprise an array of sensing devices 210 disposed in a film system 220, as shown in the illustrated embodiment in FIG. 2. Use of such film systems 220 including embedded pressure sensing devices 210 allow for simple and consistent installation of the sensor 120 on the inner surface of pipes or other components of the fluid delivery system 110. In some embodiments, a thin film system can be used to minimize thickness of the sensor 120. In such embodiments, the use of a thin film system 220 applied to the inner wall generally does not affect flow of the product 130 through the fluid delivery system in any significant way. In the various embodiments, the film system 220 can also be constructed using materials which are impervious or resistant to damage from the product 130 being used or from materials that do not tend to interact physically or chemically with any of the materials present in the product 130.

The use of a film system 220 to construct the sensor 120 is advantageous in several respects. First, during construction of a pipe or other component of a fluid delivery system 110, the application of the film system 220 to the inner surface of a component can become a part of the manufacturing process, reducing costs associated with installation of convention devices. Second, in embodiments where the film system 220 is attached during assembly of the fluid delivery system 110, the location of sensors 120 can be evaluated or modeled to determine critical points of the fluid delivery system 110 that need to be monitored or that may need additional monitoring. Finally, older fluid delivery systems 110 can be retrofitted to use the present invention by simply adding the additional sensors 120 without having to change any other configuration of the fluid delivery system 110 and without significantly affecting the performance of the fluid delivery system 110.

In the various embodiments of the invention, the sensor 120 can comprise an array of sensing devices 210 embedded in the film system 220. In the illustrated embodiment, by way of example, not by way of limitation, an array of activators and microscopic (micro) Radio Frequency (RF) tags is used. In the illustrated embodiment, the sensors operate as follows: the activators deform under pressure and press down on a larger surface of micro RF tags below to active them. Once the pressure abates, the pressure on the activators is released and the micro RF tags are deactivated.

In the various embodiments, when an RF tag is activated, the RF tag emits a signal. In some embodiments, the RF tags can be adapted to emit a signal that will correspond to a signal at a specific frequency or intensity, creating a tuned RF tag. In other embodiments, the RF tag may be configured to emit a signal that will correspond to a signal at several frequencies or intensities, depending on the amount of pressure used to activate the RF tag. In some embodiments, the array of sensing devices 210 may be divided into areas of identically tuned RF tags, so that when pressure is placed on an area of the sensor, a signal corresponding to the area of the array of sensing devices 210 is emitted. In other embodiments where more precision is required the areas may comprise only a few or even just one RF tag tuned to emit at a specific frequency, so that when pressure is placed on an area of the sensor 120, a signal pattern, rather than a single discrete signal, is generated by the sensor. Therefore, in the various embodiments, pressure upon any given set of RF tags can cause a "chord" of signal to be generated, as each tag produces a particular signal it has been tuned for. Therefore, as the activators deform, becoming either larger or smaller, the pressure against the micro RF tags can be associated with a harmonic or "chord" indicating the pressure gradient.

Similarly, the activator can be adapted to begin to deform at specific pressures. In other embodiments, the amount of deformation may be dependent on the amount of pressure. In some embodiments, the array of sensing devices 210 may be divided into areas of similarly deforming activators, so that when pressure is placed on the sensor, only some areas of activators will deform. In other embodiments where more precision is required, the areas may comprise only a few or just one activator adapted to deform at a specific pressures. In some embodiments, the array of sensing devices can comprise both differently tuned RF tags and differently deforming activators, depending on the application. It can be appreciated that in the various embodiments, the types and amount of activator deformation and the type and amount of RF tag response at various pressures can be configured to adjust sensitivity of the sensor 120.

Figure 3:
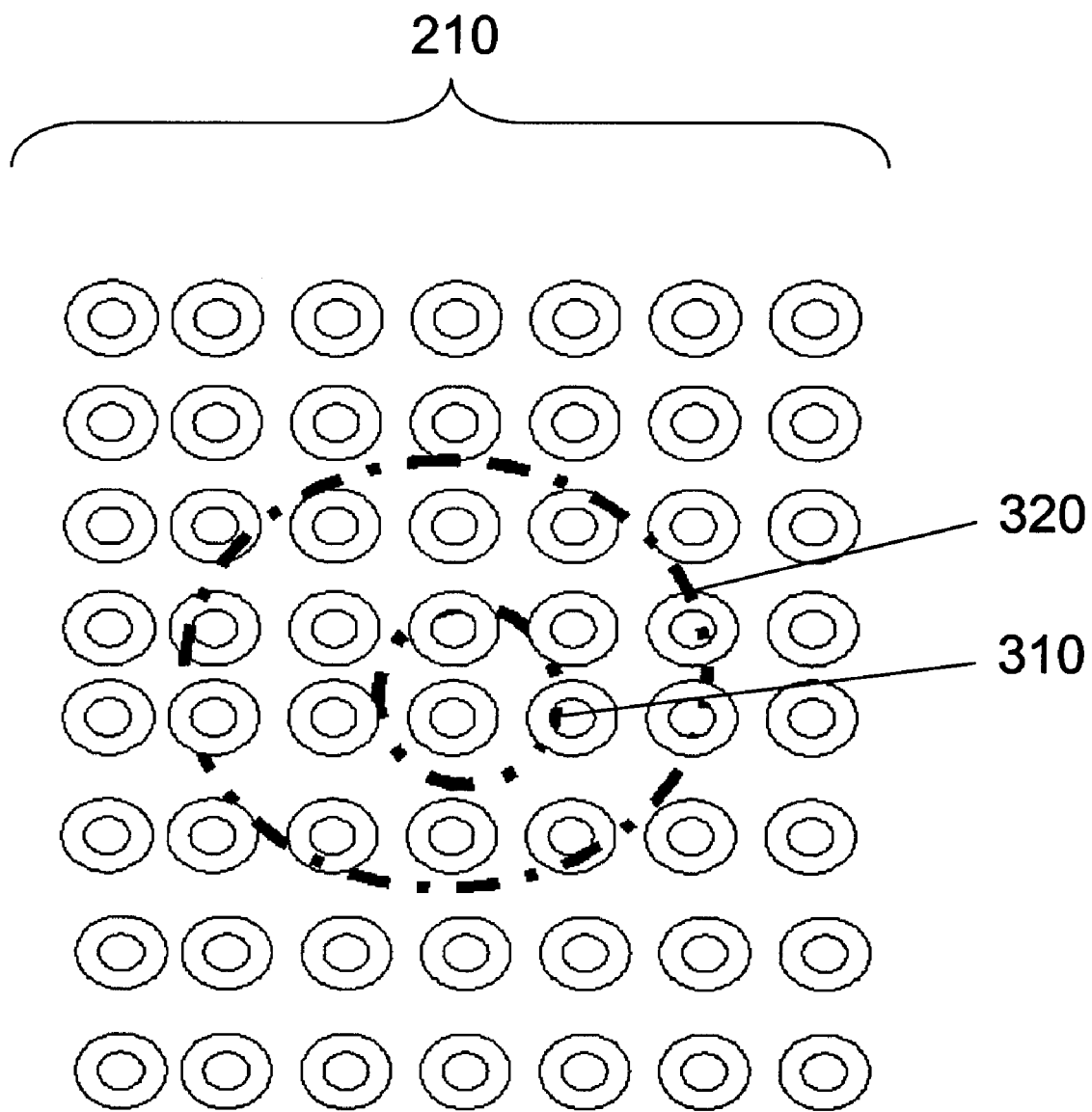
FIG. 3 is an illustration of an array of sensing devices in accordance with an embodiment of the invention.

For example, FIG. 3 illustrates an array of sensing devices 210, in a sensor 120 in accordance with an embodiment of the invention, detecting different amounts of pressure across its surface. The inner dashed circle 310 can delineate a region where the sensing devices 210 are adapted so that a very limited footprint of activation at the lowest point of pressure upon the RF tags from the activator can occur. Similarly, the outer dashed circle 320 can delineate a much larger area that can be adapted to be compressed as the activator is compressed by an increase in pressure. Therefore the sensor can be configured such that the lower the pressure, the fewer RF tags contacted and respectively, the higher the pressure, the more tags compressed. As before, the pattern of compressed tags defines a "chord". As stated previously, the different sensing areas can then be formed using different actuators, different tuned RF tags, or a combination of both.

It can be appreciated that in the various embodiments, an active system may be used, that is the RF tag or other signaling device may be configured to normally emit a signal. In such embodiments, the pressure or other detected physical parameter causes the activator to "deactivate" the signaling device.

In the various embodiments the sensor 120 further comprises a mote 230, as shown in FIG. 2. Motes, or smartdust, are miniature, often microscopic computers, generally incorporating a wireless receiver/transmitter, used to create remote sensors. In the illustrated embodiment, the mote 230 operates as a wireless receiver/transmitter, which in combination with the array of RF tags, allows the sensor 120 to operate as a remote sensor in which the mote 230 operates to transmit data collected from the sensor 120. In the various embodiments, the mote 230 can perform a number of functions. In some embodiments, the mote 230 can monitor the array of RF tags to detect the signals emitted by the RF tags. In some embodiments, the mote 230 also has the capacity to transmit radio signals to an external device. In other embodiments the mote 230 can be configured to continuously transmit sensor data to a device outside the fluid delivery system 110, either through a wire to the outside, or through a radio transmitter integrated into the mote 230. In other embodiments, the mote 230 can be configured to communicate with another mote 230 on another sensor 120, placed in the fluid delivery system 110. In other embodiments, the mote 230 can be configured to transmit any data it receives from any other mote 230, along with the data collected by the array of sensing devices 210 associated with the mote. In the various embodiments, the mote 230 can be powered by vibration with piezoelectric sources, by internal battery, or through the wire from the outside to a photoelectric cell or other power source.

Figure 4:
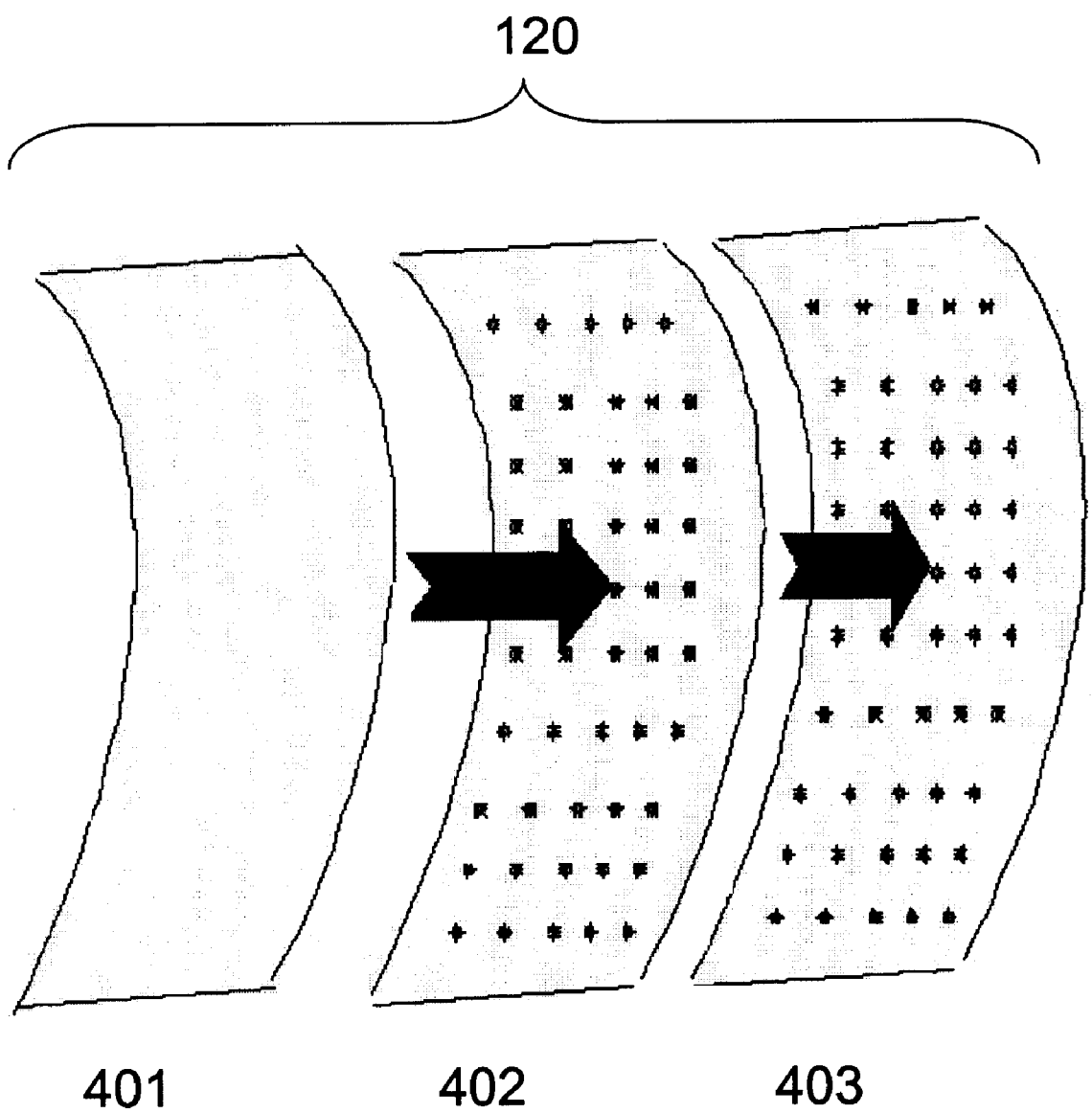
FIG. 4 is an illustration of a sensor in accordance with an embodiment of the invention.

As shown in the illustrated embodiment shown in FIG. 4, the film system 220 can comprise a plurality of stacked layers, which together constitute each of the sensors 120 for insertion into the fluid delivery system 110, as shown in FIG. 4. In some embodiments where a rigid film system is used to support the array of RF tags 210, the sensor 120 may be shaped to conform to the dimensions of the component of the fluid delivery system 110 it is to be attached to.

In the illustrated embodiment, as shown in FIG. 4, the first layer 401 can comprise a protective top coating. The first layer 401 can be adapted to prevent or resist damage to the array of sensing devices 210 from damage caused by the product 130 being transported through the fluid delivery system 110. Additionally, the first layer 401 can further be adapted so that it preferably does not react, chemically or physically, with the compound or compounds comprising the product 130. For example, the first layer 401 can be adapted to resist corrosion where corrosive materials are being used. The second layer 402 can contain an array of activators which can be adapted to deform in response to the pressure in the fluid delivery system. The bottom layer 403 can be an array of tuned, micro RF tags. Therefore, as the activators from the second layer respond to the changes in pressure within the pipeline by deforming their shape, they press against a number of tuned, micro RF tags disposed on the bottom layer 403. By using multiple layers, the sensor 120 can be customized for a particular application by adjusting the response of the activators or the frequencies emitted by the RF tag or other signaling device being used in the sensor 120. In some embodiments, the mote 230 can also be incorporated into the sandwich structure.

In operation, the system 100 in accordance with an embodiment of the invention functions as follows. First, the plurality of sensors 120 is placed on the inner wall of various components of the fluid delivery system 110. As the product 130 begins to flow through the fluid delivery system 110, the product 130 will place pressure on one or more of the plurality of sensors 120. As pressure is placed on the sensors 120, the array of sensing devices 210 begins to be activated. In the illustrated arrangements, each RF tag would be activated by the action of the corresponding activator. In accordance with some embodiments of the invention, a "chord" corresponding to the conditions detected would be generated and sent to the mote 230 associated with each sensor 120. In the various embodiments, the "chord" for a sensor 120 comprises a representation of all the signals emitted by the all the RF tags in the array of sensing devices 210 to the product 130 flow in the fluid delivery system 110. The mote 230 could then connect to another mote 230 or to the communications hub 140 and transmit the data collected from the sensor 120.

In some embodiments, motes 230 on the external length of the fluid delivery system 110 can be configured to automatically set up an ad-hoc network, in that elements of the network, such as sensors 120 and associated motes 230, can be added or replaced at will. Additionally, as shown in the illustrated embodiment in FIG. 1, one of the motes 230 can be terminal point 170 in a length of the fluid delivery system 110. In such embodiments, the motes 230 can be configured to create an ad-hoc network in that the motes 230 find other nearby motes 230 and the motes 230 communicate in a serial fashion, passing data on to the communications hub 140 or a terminal point 170.

In the illustrated embodiment, a mote 230 operating as a terminal point 170 in the ad-hoc network can connects to a wireless, communications hub 140. In some embodiments the communications hub can further include connection management software, which when executing passes along the data being sent through the ad-hoc network to the processor 150. Once the data is received by the processor 150, the processor 150 performs a continuous analysis of the incoming data. In some embodiments, the processor 150 can use a pattern recognition algorithm to detect pattern formation. By combing the sensor data from sensors 120 over extended stretches of the fluid delivery system 110, patterns can emerge that can indicate problems developing within the fluid delivery system 110. In the various embodiments the aim of the processing is to detect subtle or subliminal patterns within the data being collected, where the emerging pattern can produce a "sub-chord" that will appear in the collected data.

In the various embodiments the pattern recognition algorithm can use a statistical or structural pattern recognition approach. Statistical pattern recognition is based on statistical characterizations of patterns, assuming that the patterns are generated by a probabilistic system. Structural pattern recognition is based on the structural interrelationships of features. A wide range of algorithms can be applied for pattern recognition, from very simple Bayesian classifiers to much more powerful neural networks. The methods and algorithms discussed above are presented by way of example, not by way of limitation, and the use of other pattern recognition approaches and algorithms is contemplated by this disclosure.

In some embodiments, the detection of "sub-chords" can be enhanced by "teaching" the processor 150 to ignore background noise. In these embodiments, once a fluid delivery system 110 is assembled and product 130 begins to flow, measurements may be taken to collect a background "chord" that represents the steady-state conditions for the fluid delivery system 110. This background "chord" will then provide training set for the pattern recognition algorithm to use to detect anomalies in the data collected from the sensors 120. Based on this training set, the processor 150 can then be configured to detect "sub-chords" by differentiating them from the background "chord".

In other embodiments, the detection of "sub-chords" may not require a learning process for the processor 150. In some embodiments, the pattern recognition algorithm may simply perform real time statistical analysis of the incoming data and identify any anomalies in the data or data point that exceed the calculate variance for the process. In some embodiments, a processor 150 processing "chord" data from a large number of sensors in series may detect the emergence of a difference in the "chord" data emerging at a specific location along the fluid delivery system 110.

Furthermore, in embodiments where the sensors 120 are located within the fluid delivery system 110 at regular spacing intervals, the sensors 120 could detect subtle pressure changes in excess or insufficiency of a steady state. In such embodiments, the data collected from the sensors 120 could constitute segments of a wave pattern. When such data is available, continuous examination of wave patterns can identify subtle shifts in pressure more accurately than a series of single points of data. Furthermore, by use of algorithms incorporating chaos mathematics methods, the processor 150 can use the sensor data to predict failures in the fluid delivery system 110 before they occur.

In the illustrated embodiment, once an emerging pattern is detected, intelligent notification software can be incorporated into the processor 150, which can be used to activate one or more devices to notify one or more users of an impending problem. Furthermore, in some embodiments, the sensor data collected can be used to identify which sensors 120 have been affected, in order to determine the location of the impending failure, allowing the user an opportunity to inspect and prevent the damage before a catastrophic event occurs.

In some embodiments, the detection of certain types of "sub-chords" may signal certain types of failures. In such embodiments, aside from recognition of "sub-chords" to generally detect problems in the fluid delivery system 110, the processor 150 may be configured to recognize the emergence of such "sub-chords" that signal to the user to certain types of failures. Such embodiments are advantageous, as the type of failure may require different levels of response on the part of the user or a response from different types of users. In some embodiments, the processor 150 may also be configured to report only certain types of failures to certain users, based on the several types of recognizable "sub-chords". In other embodiments, the processor 150 could be configured to notify users of only major failures and ignore minor failures that are not anticipated to require immediate attention or result in a catastrophic failure.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

We claim:

1. A method for detecting defects in a fluid delivery line, the method comprising:

transmitting sensor data from a plurality of sensors disposed in said fluid delivery line, wherein each one of the plurality of sensors comprises a mote coupled to a plurality of sensing devices disposed in a film system, wherein said sensing devices comprise an array of pressure sensing devices configured to generate a plurality of signals, wherein the plurality of signals generated varies in response to variations in pressure, wherein a first mote associated with a first of said sensors is configured to receive sensor data from at least one other mote associated with another of said sensors, wherein the first mote is further configured to transmit data collected from the plurality of sensing devices associated with said first sensor and to transmit data received from said at least one other mote;

collecting sensor data from said sensors using a communications hub configured to receive data from at least one of said sensors; and forwarding the collected sensor data to a processor coupled to the communications hub and predicting possible failures in said fluid delivery system by analyzing the collected sensor data using the processor, wherein said analysis comprises searching for one or more patterns in said collected data associated with said array of pressure sensing devices for at least a portion of said sensors disposed downstream to a component of said fluid delivery line, wherein at least a portion of said patterns are associated with a known type of failure in said component.

2. The method of claim 1, wherein the plurality of sensing devices comprises a plurality of activating devices coupled to plurality of corresponding signaling devices, wherein the response of one of the plurality of activating devices activates a corresponding one of the plurality of signaling devices.

3. The method of claim 2, wherein a signal produced by at least a first one of the plurality of signaling devices is different from a signal produced by a second one of the plurality of signaling devices.

4. The method of claim 2, wherein at least a first one of the plurality of activating devices is adapted to respond differently from a second one of the plurality of activating devices.

5. The method of claim 2, wherein the film system further comprises at least two layers of film, wherein the plurality of sensing devices is disposed therebetween.

6. The method of claim 5, wherein the film system further comprises a middle layer of film disposed between the plurality of activating devices and the plurality of corresponding devices.

7. The method of claim 2, wherein each one of the plurality of signaling devices comprises a RF tag.

* * * * *